United States Patent
Sasa et al.

(10) Patent No.: US 8,279,043 B2
(45) Date of Patent: Oct. 2, 2012

(54) PORTABLE INFORMATION TERMINAL DEVICE

(75) Inventors: Masaaki Sasa, Hiroshima (JP); Hiroyasu Hamamura, Higashihiroshima (JP); Seiji Hamaguchi, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 934 days.

(21) Appl. No.: 11/997,128

(22) PCT Filed: Jul. 12, 2006

(86) PCT No.: PCT/JP2006/313876
§ 371 (c)(1),
(2), (4) Date: Jan. 28, 2008

(87) PCT Pub. No.: WO2007/013307
PCT Pub. Date: Feb. 1, 2007

(65) Prior Publication Data
US 2010/0164684 A1  Jul. 1, 2010

(30) Foreign Application Priority Data
Jul. 29, 2005  (JP) ................................. 2005-220085

(51) Int. Cl.
*G08B 19/00* (2006.01)
(52) U.S. Cl. ..................... 340/5.83; 340/5.53
(58) Field of Classification Search ........................ None
See application file for complete search history.

(56) References Cited

U.S. PATENT DOCUMENTS

| | | | |
|---|---|---|---|
| 6,111,517 A * | 8/2000 | Atick et al. | 340/5.83 |
| 6,819,219 B1 * | 11/2004 | Bolle et al. | 340/5.52 |
| 7,391,301 B2 * | 6/2008 | Seike et al. | 340/426.1 |
| 2003/0069805 A1 * | 4/2003 | Yui | 705/26 |
| 2004/0257196 A1 * | 12/2004 | Kotzin | 340/5.52 |
| 2005/0071635 A1 | 3/2005 | Furuyama | |
| 2005/0273626 A1 * | 12/2005 | Pearson et al. | 713/186 |
| 2007/0009139 A1 * | 1/2007 | Landschaft et al. | 382/115 |

FOREIGN PATENT DOCUMENTS

| | | | |
|---|---|---|---|
| JP | 09-069152 A | | 3/1997 |
| JP | 09-069152 A | | 3/1997 |
| JP | 2000-278658 | * | 10/2000 |
| JP | 2000-278658 A | | 10/2000 |
| JP | 2005-63077 A | | 3/2005 |
| JP | 2005-122700 A | | 5/2005 |

* cited by examiner

*Primary Examiner* — Jennifer Mehmood
*Assistant Examiner* — Brian Wilson
(74) *Attorney, Agent, or Firm* — Birch, Stewart, Kolasch & Birch, LLP

(57) ABSTRACT

An objective of the present invention is to provide a portable information terminal device capable of reducing excessive time and labor required in an authentication process. A sub-camera is started on the basis of operation to select "secret mode" by a user (FIG. 9(*a*)) and brought into a photographable state after completion of an initialization process, which is followed by automatically performing an authentication process (FIG. 9(*b*)). Therefore, it is possible to prevent troublesome photographing operation by waiting for a time course from the start of the sub-camera to reaching a photographable state, allowing reduction of excessive time and labor required in an authentication process. Moreover, a time lag generated in a period from user confirmation of a photographable state after starting the sub-camera to performing photographing operation can be reduced, where the authentication process can be carried out in a shorter period of time after starting the sub-camera, so that an amount of time required in the authentication process can be shortened.

3 Claims, 12 Drawing Sheets

PORTABLE INFORMATION TERMINAL DEVICE

BACKGROUND OF THE INVENTION

1. Field of the Invention

The present application claims priority under Paris convention on the basis of Japanese patent application No. 2005-220085 filed on Jul. 29, 2005, and cites entire contents referred from said patent application.

The present invention relates to a portable information terminal device, more specifically improvement of a portable information terminal device which carries out an authentication process on the basis of photographed images.

2. Description of the Related Art

Portable information terminal devices such as mobile phones include devices provided with a camera for generating image data by photographing an object. The camera is provided with a photoelectric conversion element such as, for example, a CCD (Charge-Coupled Device) or CMOS (Complementary Metal Oxide Semiconductor) image sensor.

In some of the portable information terminal devices of this kind distributed to the market recently, an authentication process (so-called face authentication) is carried out by guiding a user to photograph a face image by a camera during operation and comparing characteristic information such as a shape and size of eyes, nose, mouth and outline extracted from a photographed face image with user characteristic information which is stored in advance in a memory provided in the portable information terminal devices. Only when results of an authentication process show that a matching degree between characteristic information extracted from a photographed image and user characteristic information exceeds an authentication threshold value, a person who carries out operation at that time is determined to be a true user and authorized to execute processes thereafter, so that security improvement and privacy protection can be enhanced (ex. refer to Patent Document 1).

In the authentication process, a power is initially supplied to a camera so as to start the camera, where an initialization process of a photographic conversion element provided in the camera is carried out, so that the camera is allowed to photograph an object. When it is made possible to photograph the object by the camera, an image of the object with respect to the camera is displayed in real time in a display part provided in the portable information terminal device. A person who carries out operation makes adjustments so as to photograph a face of the person by the camera while looking at a display screen (i.e. finder screen) in the display part, and carries out determination operation so as to photograph a face image. Therefore, characteristic information is extracted from a photographed face image, and the characteristic information is compared with user characteristic information stored in advance in order to realize an authentication process.

[Patent Document 1] Japanese Unexamined Patent Publication No. 2000-278658

PROBLEMS TO BE SOLVED BY THE INVENTION

In the conventional authentication processing methods, when operation to determine execution of a process which requires an authentication process is carried out, the authentication process is not realized unless a camera is initially started and brought into a photographable state followed by photographing a face image on the basis of photographing operation. Since it usually takes about 0.5 second from starting the camera to reach a photographable state, a user needs to perform photographing operation after waiting for the time course, which is troublesome and problematic.

Moreover, if a user is not determined to be a true user, photographing operation needs to be carried out again, which increases troublesomeness and causes a problem of a time-consuming authentication process.

SUMMARY OF THE INVENTION

The present invention was achieved by taking the above problems into consideration, and an objective thereof is to provide a portable information terminal device which is capable of reducing excessive time and labor required in an authentication process.

Another objective of the present invention is to provide a portable information terminal device which is capable of shortening an amount of time required in an authentication process.

MEANS ADAPTED TO SOLVE THE PROBLEM

A portable information terminal device of a first aspect of the present invention is provided with: an imaging unit for photographing an object; imaging unit starting means for executing an initialization process of said imaging unit by supplying a power source to said imaging unit on the basis of operation by a user; photographing control means for controlling photographing operation performed by said imaging unit; characteristic information storage means for storing characteristic information extracted from face images as registered characteristic information in advance; and authentication processing means for performing an authentication process using said registered characteristic information on the basis of an image photographed by said imaging unit, wherein said photographing control means starts photographing on the basis of completion of said initialization process of said imaging unit by said imaging unit starting means.

According to such a configuration, the imaging unit is started on the basis of operation by a user, and the authentication process is automatically carried out on the basis of a photographable state which is provided after finishing an initialization process. That is, the characteristic information is automatically extracted from an image photographed by the imaging unit without performing photographing operation by a user after starting the imaging unit, and the characteristic information is compared with the registered characteristic information stored in advance, so that the authentication process is realized. Accordingly, it is made possible to prevent troublesome photographing operation as observed in the conventional methods, where photographing operation is carried out by waiting for a time course from starting the imaging unit to reaching a photographable state to pass. Therefore, excessive time and labor required in the authentication process can be reduced.

It is also made possible to reduce a time lag which is observed in conventional methods and generated in a period from user confirmation of a photographable state after starting the imaging unit to perform the photographing operation, and to carry out the authentication process in a short period of time after starting the photographing unit, so that an amount of time required in the authentication process can be reduced.

A portable information terminal device of a second aspect of the present invention includes: an imaging unit for photographing an object; imaging unit starting means for executing an initialization process of said imaging unit by supplying a power source to the imaging unit on the basis of operation by a user; photographing control means for controlling photographing operation performed by said imaging unit; characteristic information storage means for storing characteristic information extracted from face images as registered characteristic information in advance; authentication processing means for performing an authentication process using said registered characteristic information on the basis of an image photographed by said imaging unit; and continuous authentication means for photographing an image again in the case of an authentication failure in said authentication process and performing said authentication process on the basis of the photographed image by controlling said photographing control means and said authentication processing means.

According to such a configuration, the authentication process can be automatically carried out again if authentication has failed in the authentication process. Accordingly, even if a true user performs operation and the true user is not determined to be a true user in the authentication process performed for the first time, the authentication process is carried out again without performing photographing operation thereafter by a user. That is, the authentication process is automatically repeated until a user is determined to be a true user, which enables to reduce excessive time and labor required in the authentication process and shorten an amount of time required in the authentication process.

In a portable information terminal device of a third aspect of the present invention, said authentication processing means includes: characteristic extraction means for extracting characteristic information from said photographed image; matching degree calculation means for obtaining a numerically expressed matching degree by comparing the characteristic information extracted by said characteristic extraction means with said registered characteristic information stored in said characteristic information storage means; and matching degree determination means for comparing said matching degree with an authentication threshold value; and the device has a comparison result display means for displaying comparison results between said matching degree obtained in said authentication process and said authentication threshold value.

According to such a configuration, a comparison result between the matching degree in the authentication process and the authentication threshold value is displayed, which allows user to confirm whether or not a face image of the user photographed in the authentication process is an easily recognizable image on the basis of the display.

In the portable information terminal device of a fourth embodiment of the present invention, said authentication processing means carries out said authentication process on the basis of a series of operation, and said imaging unit starting means starts said imaging unit on the basis of operation performed prior to last operation in said series of operation.

According to such a configuration, the imaging unit can be started soon on the basis of operation performed prior to last operation. In this case, if the imaging unit is brought into a photographable state before last operation is carried out, waiting time for a photographable state of the imaging unit can be omitted. Moreover, if there is provided a configuration where the authentication process is automatically carried out immediately after the imaging unit is brought into a photographable state, the authentication process can be completed before carrying out last operation, which makes it possible to further reduce an amount of time required in the authentication process.

A portable information terminal device of a fifth aspect of the present invention includes imaging unit stopping means for stopping a power supply to said imaging unit if subsequent operation in said series of operation is not carried out within a predetermined amount of time after starting said imaging unit.

According to such a configuration, the imaging unit can be prevented from being left for a long period of time without starting the authentication process after starting said imaging unit. Since the imaging unit consumes a relatively large amount of driving power, driving the imaging unit is discontinued when the authentication process is not started, allowing reduction of power consumption.

A portable information terminal device of a sixth aspect of the present invention includes imaging unit stopping means for stopping a power supply to said imaging unit if operation which differs from subsequent operation in said series of operation is carried out after starting said imaging unit.

According to such a configuration, the imaging unit can be prevented from being left for a long period of time without starting the authentication process after starting the imaging unit. Since the imaging unit consumes a relatively large amount of driving power, driving the imaging unit is discontinued when an authentication process is not started, allowing reduction of power consumption.

EFFECTS OF THE INVENTION

According to the portable information terminal device of the present invention, the imaging unit is started on the basis of operation by a user and brought into a photographable state after finishing the initialization process, which is used as a basis to carry out the authentication process automatically. Accordingly, it is made possible to prevent troublesomeness of performing photographing operation by waiting for a time course from starting the imaging unit to reaching a photographable state to pass, so that excessive time and labor required in the authentication process can be reduced. It is also made possible to reduce a time lag generated in a period from user confirmation of a photographable state after starting the imaging unit to perform photographing operation, where the authentication process can be carried out in a shorter period of time after starting the imaging unit, so that an amount of time required in the authentication process can be shortened.

Moreover, according to the portable information terminal device of the present invention, since the authentication process can be automatically repeated by automatically performing an automatic authentication process again until a user is determined to be a true user if authentication has failed in the authentication process, excessive time and labor required in the authentication process can be reduced, so that an amount of time required in the authentication process can be shortened. Displaying comparison results between the matching degree in the authentication process and the authentication threshold value allows a user to confirm whether or not a face image of the user photographed in the authentication process is an easily recognizable image.

Furthermore, according to the present invention, the imaging unit can be started soon on the basis of operation performed prior to last operation. If the imaging unit is brought into a photographable state before last operation is carried out, waiting time for a photographable state of the imaging unit can be omitted. A configuration of automatically performing the authentication process immediately after the imaging unit is brought into a photographable state also allows completion of the authentication process before last operation is carried out, so that an amount of time required in the authentication process can be shortened.

The portable information terminal device of the present invention also makes it possible to prevent the imaging unit from being left for a long period of time after starting the imaging unit and without starting the authentication process by discontinuing the driving of the imaging unit when the authentication process does not start, allowing reduction of power supply.

DETAILED DESCRIPTION OF THE INVENTION

1. First Embodiment

Figure 1:
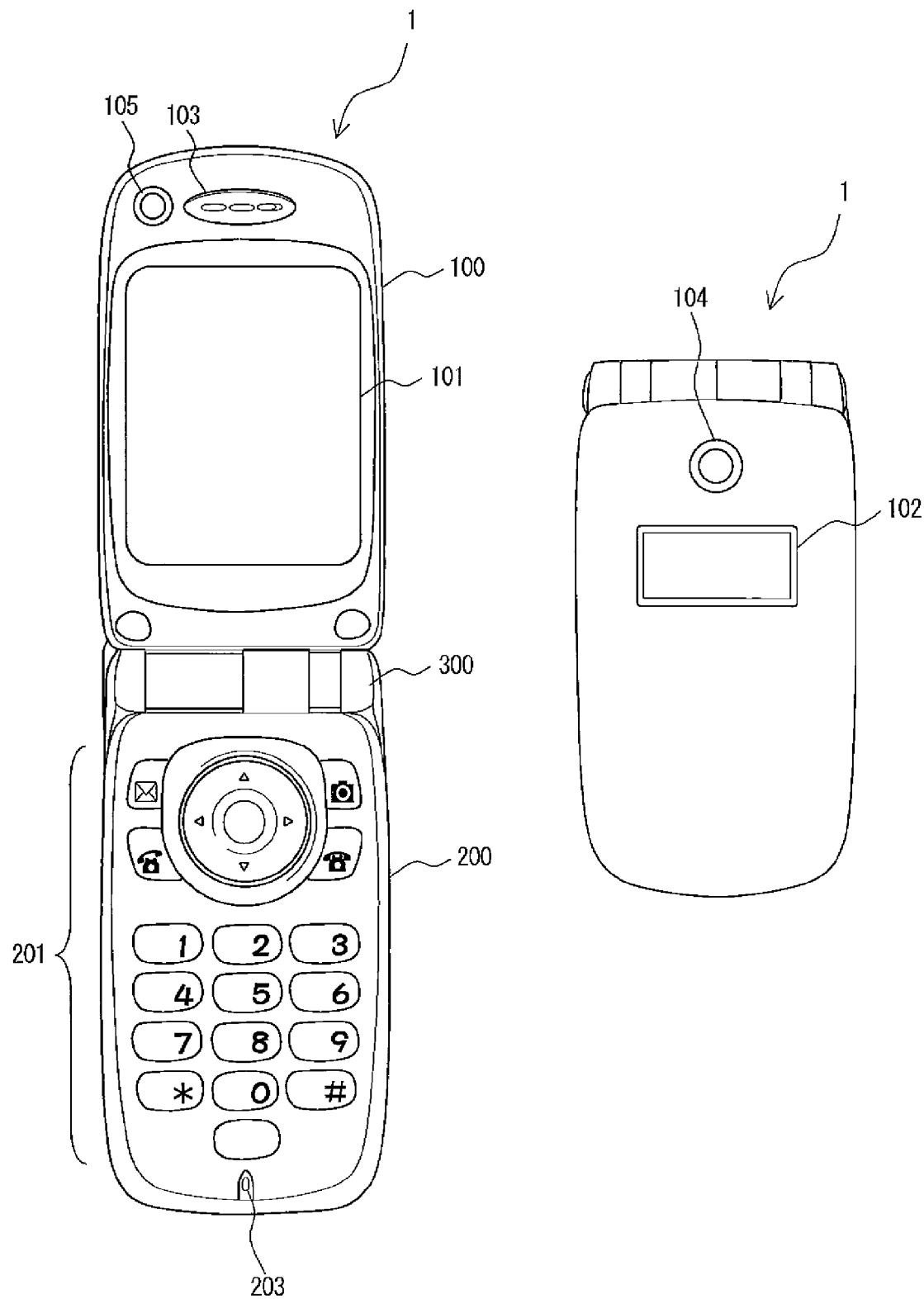
FIG. 1 is an appearance view showing an example of a portable information terminal device according to a first embodiment of the present invention, showing a mobile phone as an example of the portable information terminal device.

FIG. 1 is an appearance view showing an example of a portable information terminal device according to a first embodiment of the present invention, wherein a mobile phone 1 is presented as an example of the portable information terminal device. The mobile phone 1 is a so-called folding-type mobile phone, where a display case 100 and an operation case 200 are connected via a hinge part 300 so that the display case 100 and the operation case 200 can be folded by disposing respective faces of the cases to be opposed from one another.

The display case 100 has a case face which is disposed inside when it is folded and provided with a main display part 101, a telephone receiver 103, and a sub-camera 105, and a case face which is disposed outside when it is folded and provided with a sub-display part 102 and a main camera 104. The operation case 200 also has a case face which is disposed inside when it is folded and provided with a multiple number of operation keys 201 and a telephone microphone 203. Such a folding-type mobile phone 1 can be compactly carried in a folded state, where depressing operation of the operation keys 201 can be performed while looking at a screen displayed in the main display part 101 when the cases are expanded. That is, main information is displayed by using the main display part 101, and main operation input is realized by using the operation keys 201.

The mobile phone 1 has a function (i.e. so-called face authentication function) to photograph a face image of a user by the sub-camera 105 when the user operates the operation keys 201 while looking at a screen displayed in the main display part 101, where the user who performs operation at that time is authorized to execute processes thereafter only when the user is determined to be a true user from the results of an authentication process performed on the basis of characteristic information which is extracted from the face image. Owing to the authentication process performed in execution of highly secretive functions, security enhancement and privacy protection can be realized.

Figure 2:
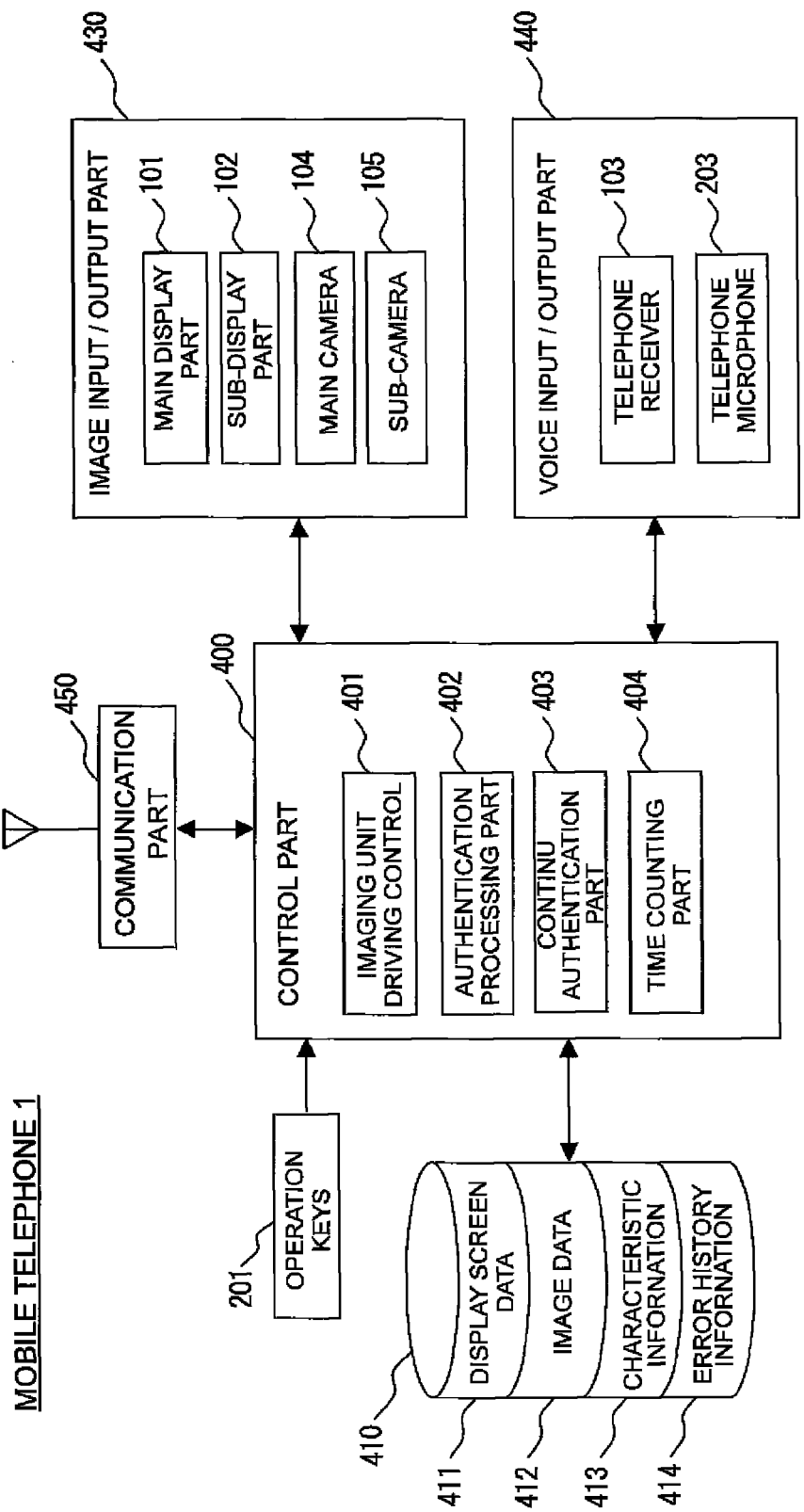
FIG. 2 is a block diagram showing an example of an internal configuration of the mobile phone shown in FIG. 1.

FIG. 2 is a block diagram showing an example of an internal configuration of the mobile phone 1 shown in FIG. 1. A control part 400 is a processor which controls main operation of the mobile phone 1, including an imaging unit driving control part 401, an authentication processing part 402, a continuous authentication part 403, and a time counting part 404. Operation signals outputted from the operation keys 201 are inputted to the control part 400 which is connected to a memory 410, an image input/output part 430, a voice input/output part 440, and a communication part 450 so as to enable input/output thereto/therefrom.

The image input/output part 430 includes the main display part 101, the sub-display part 102, the main camera 104, and the sub-camera 105. The main camera 104 and the sub-camera 105 are unitized as imaging units, and the imaging units are provided with a photoelectric conversion element such as a CCD (Charge-Coupled Device) or CMOS (Complementary Metal Oxide Semiconductor) image sensor and a control circuit. Employed here is a photoelectric conversion element which requires an initialization process such as offset and gain adjustments after supplying a power source to the imaging unit.

The voice input/output part 440 is provided with the receiver 103 and the transmitting microphone 203. The communication part 450 transmits/receives voice data and image data by transmitting/receiving radio waves to/from a base station not shown.

The imaging unit driving control part 401 controls driving of the main camera 104 and the sub-camera 105 by transmitting signals to the image input/output part 430. In the present embodiment, the imaging unit driving control part 401 controls driving of the sub-camera 105, so that a face image of a person who operates the operation keys 201 while looking at the main display part 101 is photographed by the sub-camera 105 in order to carry out the authentication process on the basis of characteristic information extracted from the face image. It should be noted that a configuration of performing an authentication process by photographing the face image using the main camera 104 may also be provided.

The authentication processing part 402 compares characteristic information extracted from a photographed image with user characteristic information (i.e. registered characteristic information) which is stored in advance in the memory 410 so as to determine whether or not a person who performs operation at that time is a true user. The continuous authentication part 403 controls the imaging unit driving control part 401 and the authentication processing part 402 so as continuously perform the authentication process for a plural number of times. The time counting part 404 is provided to output time information by measuring an amount of time.

Parts assigned to the memory 410 include a display screen data storage part 411, an image data storage part 412, a characteristic information storage part 413, and an error history information storage part 414. The display screen data storage part 411 stores screen data displayed in the main display part 101 and the sub-display part 102. The image data storage part 412 stores image data photographed by the main camera 104 and the sub-camera 105, and image data received from the outside via the communication part 450. The characteristic information storage part 413 stores characteristic information of face images for use in the authentication process. The error history information storage part 414 stores information obtained in authentication which has resulted in a failure as error history information.

It should be noted that a configuration may be provided in such that characteristic information of face images and image data of face images for use in the authentication process is stored in a storage medium (not shown) such as, for example, an SIM (Subscriber Identity Module) card which is attachable to the mobile phone 1.

Figure 3:
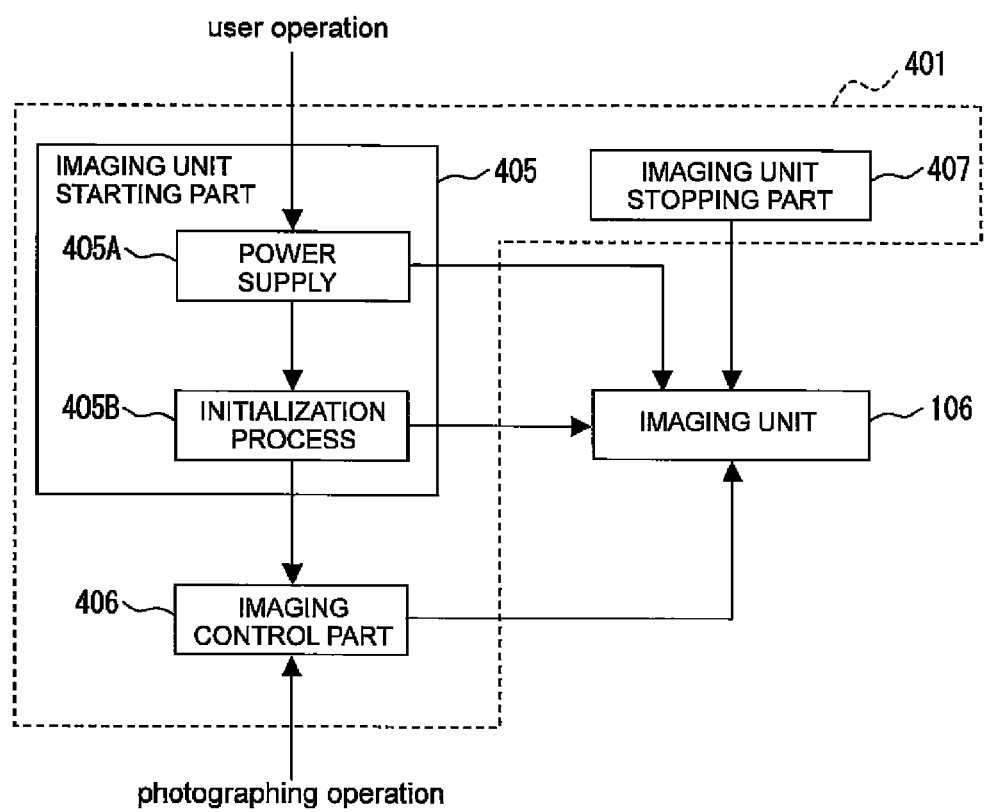
FIG. 3 is a block diagram showing a configuration example of an imaging unit driving control part of FIG. 2.

FIG. 3 is a block diagram showing a configuration example of the imaging unit driving control part 401 of FIG. 2. The imaging unit driving control part 401 is provided with an imaging unit starting part 405, an imaging control part 406, and an imaging unit stopping part 407. The imaging unit starting part 405 transmits control signals to the main camera 104 and the sub-camera 105 so as to start these cameras, including a power supply part 405A for supplying a power source to the imaging unit 106 (i.e. the main camera 104 and the sub-camera 105) on the basis of operation by a user, and an initialization processing part 405B for executing an initialization process.

The imaging control part 406 controls photographing operation of the main camera 104 and the sub-camera 105 on the basis of input signals from the initialization processing part 405B and photographing operation by a user in order to generate still image data of an object obtained at that time with respect to the main camera 104 and the sub-camera 105. The imaging unit stopping part 407 discontinues a power supply to the main camera 104 and the sub-camera 105, where driving these imaging units is discontinued.

Figure 4:
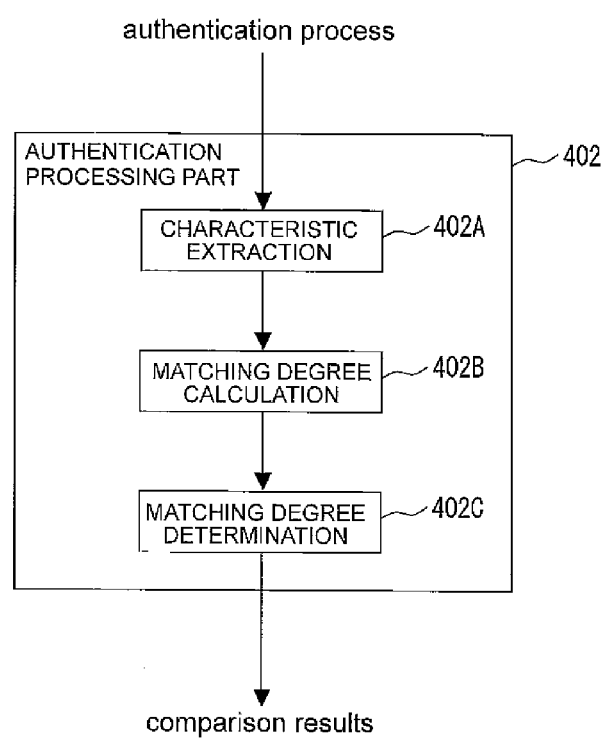
FIG. 4 is a block diagram showing a configuration example of an authentication processing part of FIG. 2.

FIG. 4 is a block diagram showing a configuration example of the authentication processing part 402 of FIG. 2. The authentication processing part 402 is provided with a characteristic extraction part 402A, a matching degree calculation part 402B, and a matching degree determination part 402C. When an authentication process starts, the characteristic extraction part 402A extracts characteristic information such as a shape and size of each part of a face such as eyes, nose, mouth and outline from a face image photographed by the sub-camera 105. The matching degree calculation part 402B compares characteristic information extracted by the characteristic extraction part 402A with registered characteristic information which is stored in the characteristic information storage part 413 of the memory 410 so that a numerically expressed matching degree is calculated.

The matching degree determination part 402C compares a matching degree calculated by the matching degree calculation part 402B with a predetermined threshold value (i.e. authentication threshold value) so as to output the comparison results. At this time, if the matching degree exceeds the authentication threshold value, it means that a user is determined to be a true user and the authentication has succeeded, whereas if the matching degree is smaller than the authentication threshold value, it means that a user is not determined to be a true user and the authentication has failed. The matching degree here is a ratio (%) occupied by matching characteristic information out of entire characteristic information compared, where the authentication threshold value is usually set to be a predetermined value equal to or larger than 90%.

Figure 5:
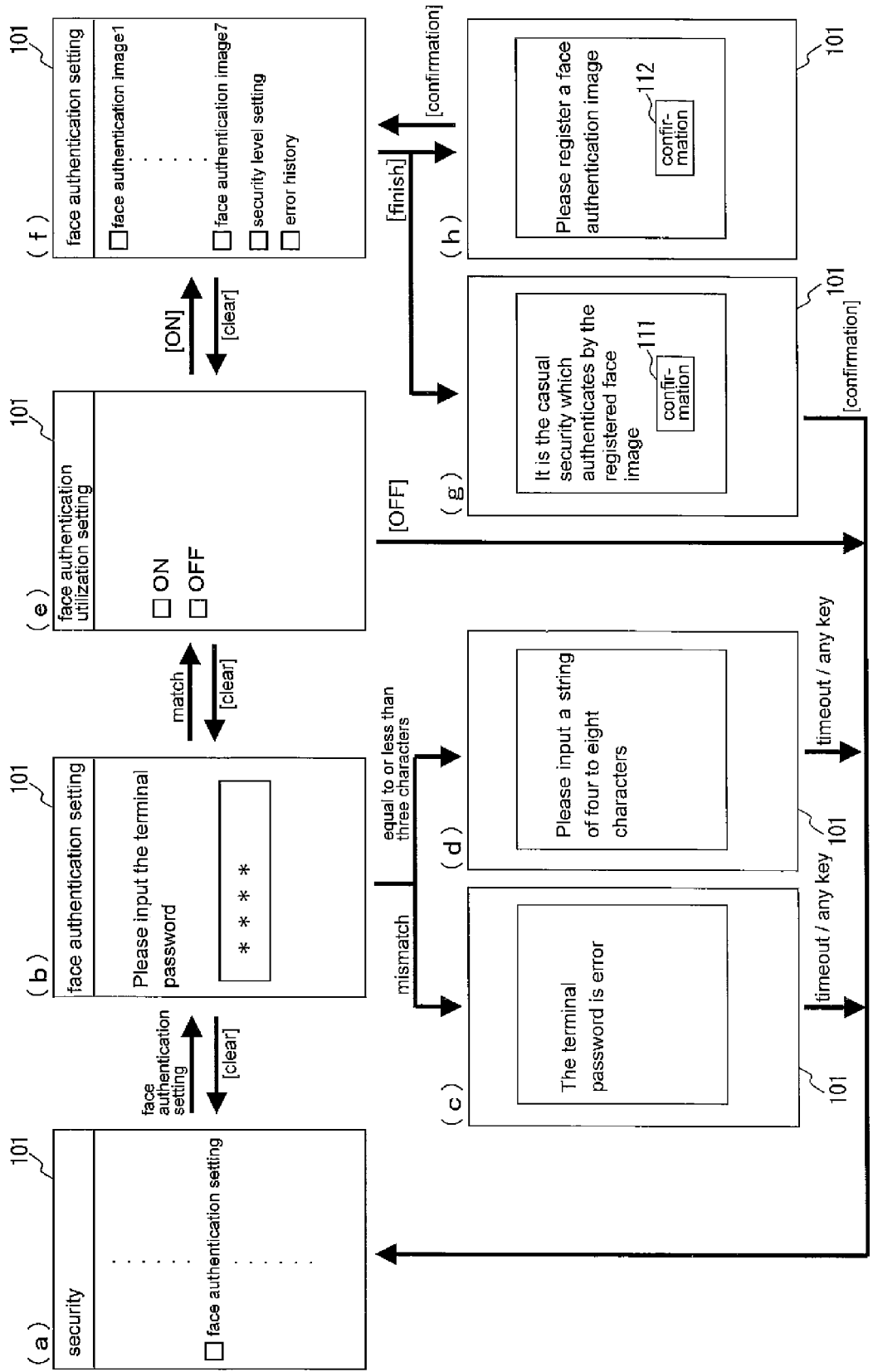
FIG. 5 is a diagram showing a display example of a main display part in a setting related to face authentication.

FIG. 5 is a diagram showing a display example of the main display part 101 in a setting of face authentication. When a user reads a security setting screen by operating the operation keys 201 (refer to FIG. 5(a)) and carries out operation to select a "face authentication setting" item out of items displayed in the security setting screen, the main display part 101 displays a screen for guiding a user to input a terminal password which is assigned to the mobile phone 1 in advance (refer to FIG. 5(b)). In this display screen, if a user operates a clear key included in the operation keys 201, the main display part 101 returns to display the security setting screen shown in FIG. 5(a).

The terminal password is made of an arbitrary character string of four to eight digits for example and set in advance at the time of purchasing the mobile phone 1 but can be changed by a user in operation of the operation keys 201. In the terminal password input screen of FIG. 5(b), if a character string inputted by operating the operation keys 201 does not match a terminal password set in advance, a screen indicating the mismatch is displayed in the main display part 101 (refer to FIG. 5(c)). If a character string equal to or less than three digits is inputted in the terminal password input screen, the main display part 101 displays a screen indicating a character string of four to eight digits should be inputted (refer to FIG. 5(d)).

If a predetermined amount of time lapses into timeout or any key included in the operation keys 201 is operated after the main display part 101 displays a screen as shown in FIG. 5(c) or FIG. 5(d), the main display part 101 returns to the display of the security setting screen as shown in FIG. 5(a).

When a character string inputted in the terminal password input screen of FIG. 5(b) matches a terminal password set in advance, the main display part 101 is switched to display a face authentication utilization setting screen for setting on/off of a mode to carry out face authentication (refer to FIG. 5(e)). In this display screen, operation of the clear key included in the operation keys 201 causes the main display part 101 to return to display the terminal password input screen shown in FIG. 5(b). Moreover, if the face authentication is turned off by operating the operation key 201 in the face authentication utilization setting screen, the main display part 101 returns to display the security setting screen shown in FIG. 5(a).

In the face authentication utilization setting screen of FIG. 5(e), if the face authentication is turned on by operating the operation key 201, the main display part 101 is switched to display a face authentication setting screen for the setting of face authentication (refer to FIG. 5(f)).

In the present embodiment, characteristic information which is extracted from image data of seven pieces at maximum can be stored in the memory 410 as registered characteristic information for use in face authentication. Face authentication based on registered characteristic information which is extracted from image data of two or more pieces increases a probability of successful authentication (i.e. person acceptance ratio) when a true user carries out face authentication, where authentication failures caused by slight differences such as facial expression of a user and an angle to receive light can be prevented. However, the configuration of extracting registered characteristic information for use in face authentication from image data of seven pieces is not limited, and there may also be a configuration of performing face authentication on the basis of registered characteristic information extracted from single image data for example.

Face images of a user are photographed in advance by the user using the main camera 104 or the sub-camera 105 so as to store these image data in the image data storage part 412 of the memory 410. Since face authentication is carried out on the basis of registered characteristic information which is extracted from these image data and stored in the characteristic information storage part 413 of the memory 410, these image data is not required in face authentication, but can be stored in the memory 410 to confirm face images by the user who reads these image data, so that conveniences in operation can be improved.

The face authentication setting screen of FIG. 5(*f*) includes items which are made to correspond to respective images expressing a user (i.e. face authentication images) as extraction sources of the aforementioned registered characteristic information, an item which is made to correspond to a setting of an authentication threshold value in face authentication (i.e. security level setting), and an item which is made to correspond to error history. In this display screen, if any one of the items which are made to correspond to face authentication images is selected, a screen for overwriting registration and confirmation of a face authentication image (i.e. face authentication image registration screen) is displayed. If the item which is made to correspond to a security level setting is selected, a screen for setting an authentication threshold value for use in face authentication (i.e. security level setting screen) is displayed. Moreover, if the item which is made to correspond to error history is selected, a screen for displaying error history (error history screen) is displayed.

Various kinds of these settings are followed by operation of the operation keys 201 to complete the face authentication setting, where the main display part 101 is switched to display a screen as shown in FIG. 5(*g*) or FIG. 5(*h*). That is, if at least one of face authentication images is registered, the main display part 101 displays a screen indicating face authentication is carried out on the basis of characteristic information extracted from the face authentication image (refer to FIG. 5(*g*)), where selection of a confirmation key 111 included in this screen causes the main display part 101 to return to display the security setting screen shown in FIG. 5(*a*). In contrast, if none of face authentication images is registered, the main display part 101 displays a screen indicating to register face authentication images (refer to FIG. 5(*h*)), where selection of a confirmation key 112 included in this screen causes the main display part 101 to return to display the face authentication setting screen shown in FIG. 5(*f*).

Figure 6:
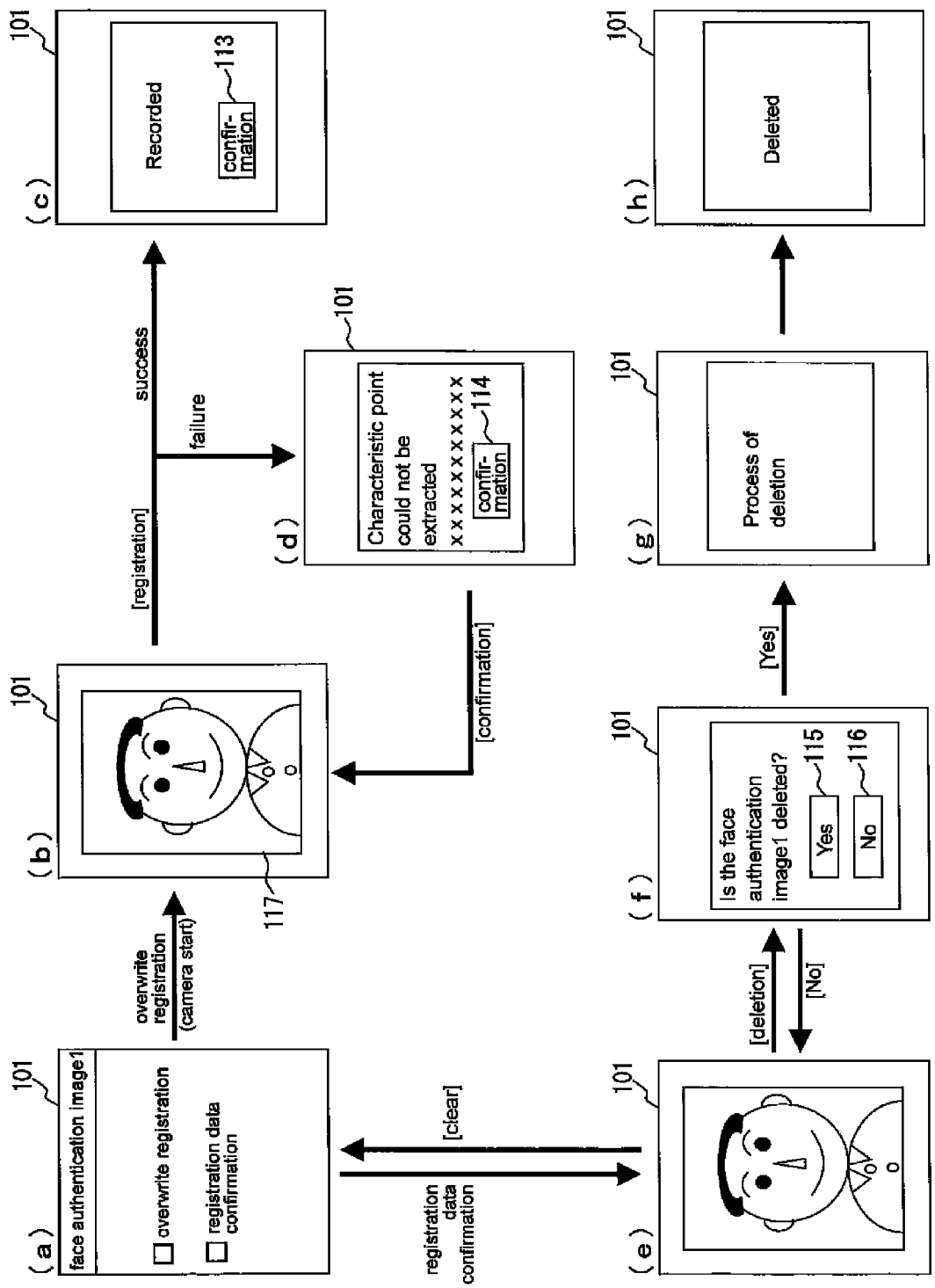
FIG. 6 is a diagram showing a display example of a face authentication image registration screen.

FIG. 6 is a diagram showing a display example of a face authentication image registration screen. In the face authentication setting screen of FIG. 5(*f*), if any one of the items which are made to correspond to face authentication images is selected, the main display part 101 is switched to display the face authentication image registration screen corresponding to the face authentication image as shown in FIG. 6(*a*). The face authentication image registration screen includes an item for "overwrite registration" and an item for "registration data confirmation".

Operation to select the item for "overwrite registration" out of the items displayed in the face authentication image registration screen of FIG. 6(*a*) causes the sub-camera 105 to start, where the main display part 101 displays an image of an object with respect to the sub-camera 105 in real time after the sub-camera 105 is brought into a photographable state (refer to FIG. 6(*b*)). At this time, the main display part 101 functions as a finder of the sub-camera 105, where a face of a person who performs operation while looking at a screen displayed in the main display part 101 is projected in a finder screen constituted by the main display part 101.

In the finder screen of FIG. 6(*b*), registration operation performed by operation of a determination key included in the operation keys 201 is carried out after positional adjustments of a face of a user by the user himself, which is followed by an extracting process of characteristic information by the characteristic extraction part 402A of the control part 400 from an image photographed by the sub-camera 105 at that time.

In this case, characteristic information such as a shape and size of eyes, nose, mouth and outline can be extracted if positional adjustments of a face of a user are appropriately made, but characteristic information cannot be extracted if positional adjustments are not appropriately made or if the face of the user is not projected in the main display part 101 at all. Successfully extracted characteristic information is stored in the characteristic information storage part 413 of the memory 410, while face images obtained at that time are stored as face authentication images in the image data storage part 412 of the memory 410.

If extraction of characteristic information has succeeded, the main display part 101 displays a screen indicating that characteristic information based on the face images is stored (or recorded) in the memory 410 (refer to FIG. 6(*c*)). If a user selects a confirmation key 113 included in the display screen, the main display part 101 returns to display the face authentication setting screen shown in FIG. 5(*f*). In contrast, in a case of failing to extract characteristic information, the main display part 101 displays a screen indicating the failure with a reason of the failure in the characteristic information extraction (refer to FIG. 6(*d*)), where selection of a confirmation key 114 included in the display screen by the user causes the main display part 101 to return to display a finder screen shown in FIG. 6(*b*), and a face image can be photographed by the sub-camera 105 again.

Operation to select the item for "registration data confirmation" out of the items displayed in the face authentication image registration screen of FIG. 6(*a*) is followed by reading a corresponding face authentication image stored in the image data storage part 412 of the memory 410, where the face authentication image is displayed in the main display part 101 (refer to FIG. 6(*e*)). A user is allowed to confirm a registered face authentication image from the face authentication image confirmation screen shown in FIG. 6(*e*). In this display screen, operation of the clear key included in the operation keys 201 causes the main display part 101 to return to display the face authentication image registration screen shown in FIG. 6(*a*).

In the face authentication image confirmation screen of FIG. 6(*e*), operation of the operation keys 201 by a user to delete a corresponding face authentication image causes the main display part 101 to switch to display a deletion confirmation screen for confirming whether or not the face authentication image may be deleted (refer to FIG. 6(*f*)). This display screen includes a "yes" key 115 for instructing to delete the face authentication image and a "no" key 116 for instructing not to delete the face authentication image. In the deletion confirmation screen of FIG. 6(*f*), selection of the "yes" key 116 by operating the operation keys 201 causes the main display part 101 to return to display the face authentication image confirmation screen shown in FIG. 6(*e*).

In the deletion confirmation screen of FIG. 6(*f*), selection of the "yes" key 115 by operating the operation keys 201 causes the image data storage part 412 and the characteristic information storage part 413 of the memory 410 to start processes to delete a corresponding face authentication image and registered characteristic information, where the main display part 101 displays a screen indicating it is in the process of deletion (refer to FIG. 6(*g*)). When the processes to delete the face authentication image and registered characteristic information are completed, the main display part 101 displays a screen indicating the process completion (refer to FIG. 6(*h*)), and the main display part 101 returns to display the face authentication setting screen shown in FIG. 5(*f*) due to timeout after a predetermined amount of time lapses or in response to operation of any key included in the operation keys 201.

Figure 7:
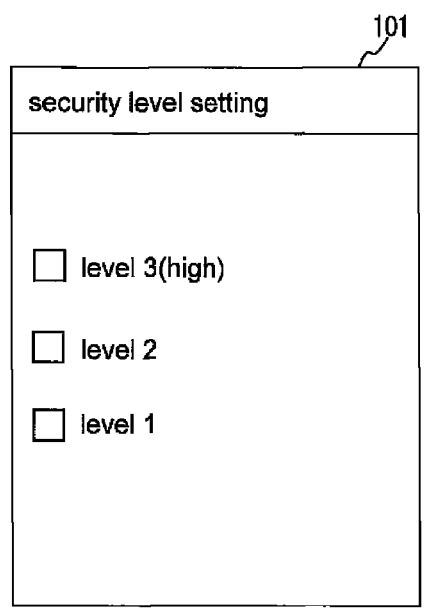
FIG. 7 is a diagram showing a display example of a security level setting screen.

FIG. 7 is a diagram showing a display example of a security level setting screen. In the face authentication setting screen of FIG. 5(*f*), selection of the item which is made to correspond to the security level setting causes the main display part 101 to switch to display the security level setting screen for setting an authentication threshold value for use in face authentication as shown in FIG. 7. Security levels set in advance include a "level 3" having a highest authentication threshold value, "level 2" having an authentication threshold value which is lower than that of the "level 3", and "level 1" having an authentication threshold value which is lower than that of the "level 2", where any one of the security levels can be selected in the security level setting screen.

Figure 8:
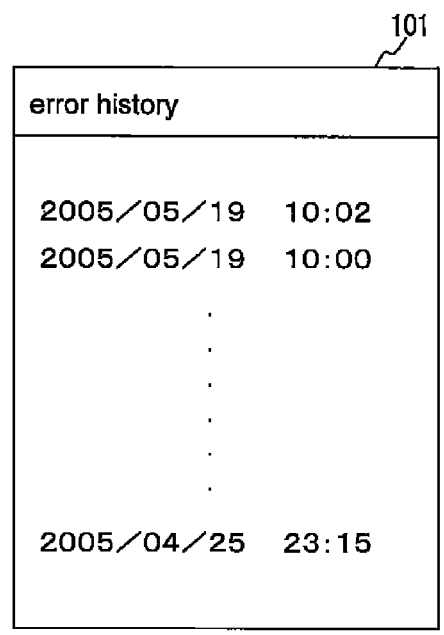
FIG. 8 is a diagram showing a display example of an error history screen.

FIG. 8 is a diagram showing a display example of an error history screen. In the face authentication setting screen of FIG. 5(*f*), selection of the item which is made to correspond to the error history causes the main display part 101 to switch to display the error history screen for displaying an error history as shown in FIG. 8. The error history screen displays a list of time information expressing data/time of a predetermined number of authentication failures (ex. 9 failures) as error history information. In the case of having a new authentication failure in a state that the above error history information including a predetermined number of failures is stored in the error history information storage part 414 of the memory 410, oldest error history information is deleted and new error history information is stored in the memory 410, while the error history screen is renewed to display the new error history information.

Figure 9:
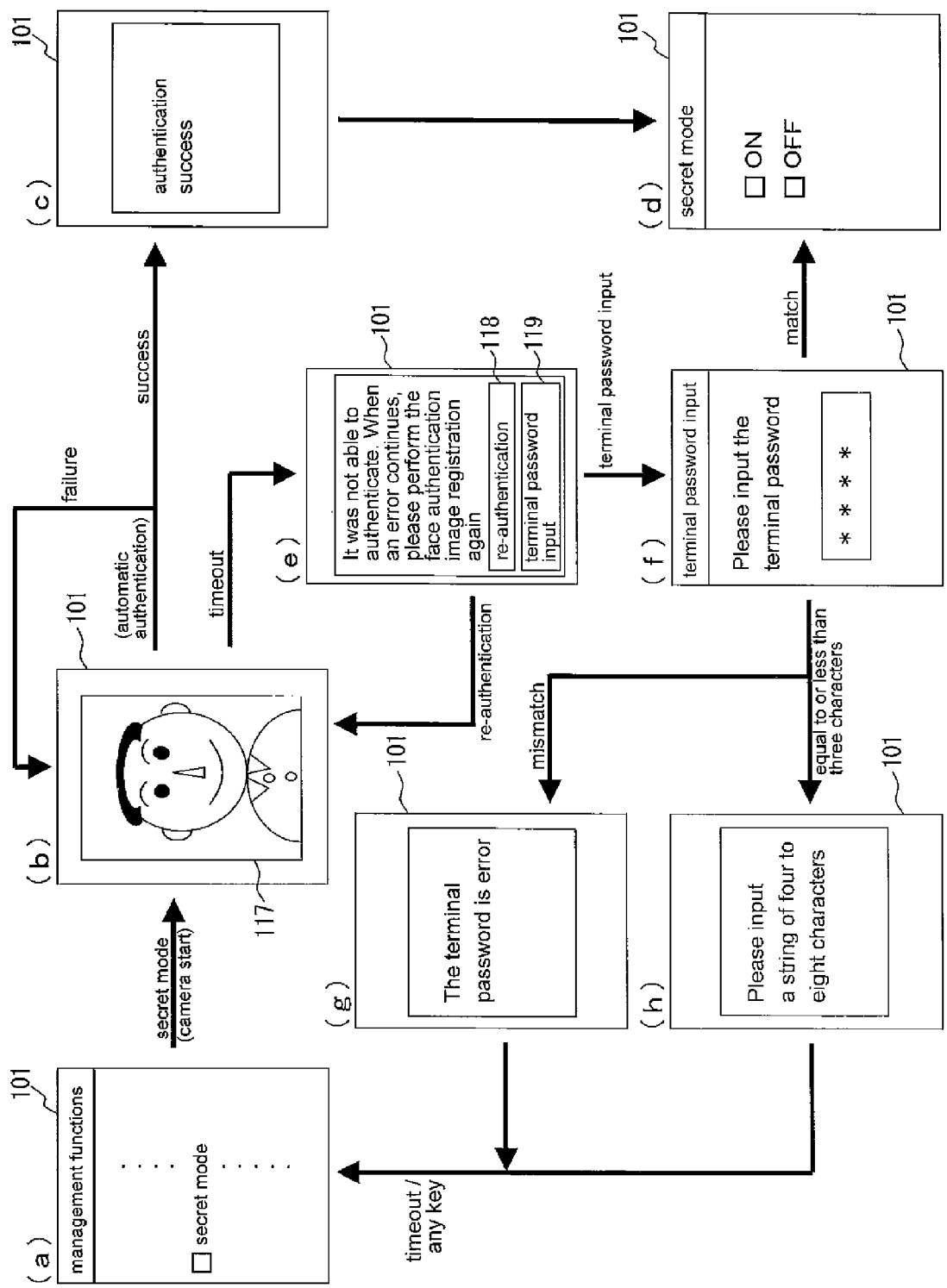
FIG. 9 is a diagram showing a display example of a main display part when the face authentication is carried out.

FIG. 9 is a diagram showing a display example of the main display part 101 when face authentication is carried out. In this example, the face authentication is carried out in switching on/off of a secret mode included in management functions of the mobile phone 1. The on state of the secret mode exhibits a state where not only normal data but also data registered in advance as secret data are displayed, whereas the off state of the secret mode exhibits a state where normal data is exclusively displayed without displaying secret data.

In a management function screen for setting management functions of the mobile phone 1 as shown in FIG. 9(*a*), operation to select a "secret mode" item out of items displayed in the management function screen causes the sub-camera 105 to start. The sub-camera 105 is then brought into a photographable state, followed by displaying an image of an object with respect to the sub-camera 105 in the main display part 101 in real time (refer to FIG. 9(*b*)), where automatic authentication starts. At this time, when the sub-camera 105 is brought into a photographable state after finishing an initialization process thereof, a face image for authentication is photographed without performing photographing operation by a user, where the characteristic information is further extracted from the photographed image. The extracted characteristic information is compared with user characteristic information stored in advance in the characteristic information storage part 413 of the memory 410, which enables an authentication process to be performed automatically.

In this authentication process, if a matching degree between extracted characteristic information of a face image and user characteristic information stored in the memory 410 exceeds an authentication threshold value which is set in advance in the security level setting screen, the operator is determined to be a true user. In this case, a user is informed of the authentication success by visual effects of a highlight display which is realized by a so-called action focus with respect to a face image of the user displayed in the main display part 101.

Thereafter, the main display part 101 displays a message indicating the authentication success (refer to FIG. 9(*c*)), followed by switching to a screen for turning on/off the secret mode after a predetermined amount of time lapses (refer to FIG. 9(*d*)). In contrast, in the case of an authentication failure due to a smaller matching degree of characteristic information than the authentication threshold value, characteristic information is automatically extracted from an image photographed by the sub-camera 105 at that time, and the characteristic information is compared with user characteristic information stored in the memory 410.

In the present embodiment, the authentication process is thus continuously repeated in an authentication failure until a predetermined amount of time (ex. three seconds) lapses into timeout, and the authentication process is completed when authentication has succeeded. For example, if an amount of time to reach timeout is set to be three seconds, the authentication process is repeated for about seven times at maximum. That is, an amount of time required for a single authentication process is about 0.4 second, and successful authentication in a single authentication process makes it is possible to proceed to a subsequent process with substantially no waiting time after finishing an initialization process of the sub-camera 105. While the authentication process is repeated, the main display part 101 displays a finder screen, where an image of an object with respect to the sub-camera 105 is displayed in real time.

While the authentication process is repeated for a predetermined number of times, the main display part 101 displays a screen corresponding to a matching degree of characteristic information as a comparison result of the characteristic information obtained in each of the authentication processes. More specifically, a frame 117 of a finder screen displayed in the main display part 101 is displayed by a color corresponding to a matching degree of the characteristic information. Therefore, a comparison result of the matching degree of the characteristic information obtained at the time of the authentication process is displayed, so that a user is allowed to confirm whether or not a face image of the user photographed in the authentication process is an easily recognizable image on the basis of the display.

It should be noted that such a configuration is not limited, and a configuration of presenting the matching degree of the characteristic information in the main display part 101 by a level display using a numerical value and graph or the like may be provided. Moreover, a configuration of displaying the comparison results in entire authentication processes is not limited, and there may also be a configuration of displaying the comparison results at least in a single authentication process.

In a case of reaching timeout after a predetermined amount of time lapses from the start of automatic authentication, the main display part 101 displays a screen indicating an authentication failure (refer to FIG. 9(*e*)). Selection of a re-authentication key 118 included in the displayed screen by a user causes the main display part 101 to return to display a finder screen shown in FIG. 9(*b*), where automatic authentication starts again. Whereas, selection of a terminal password input key 119 displayed in the main display part 101 in FIG. 9(e) by the user causes the main display part 101 to switch to display a terminal password input screen for guiding the user to input a terminal password (refer to FIG. 9(f)).

If a character string inputted in the terminal password input screen of FIG. 9(f) matches a terminal password set in advance, the main display part 101 is switched to display a screen for switching on/off of the secret mode (refer to FIG. 9(d)).

In contrast, if a character string inputted in the terminal password input screen of FIG. 9(f) by operating the operation keys 201 does not match the terminal password set in advance, the main display part 101 displays a screen indicating the mismatch (refer to FIG. 9(g)). If a character string equal to or less than three digits is inputted in the terminal password input screen, the main display part 101 displays a screen indicating a character string of four to eight digits should be inputted (refer to FIG. 9(h)). After displaying the screen shown in FIG. 9(g) or FIG. 9(h), a predetermined amount of time lapses into timeout or a user operates any key included in the operation keys 201, where the main display part 101 returns to display the management function screen shown in FIG. 9(a).

2. Second Embodiment

Explained in the first embodiment was the configuration of performing automatic authentication by starting the sub-camera 105 on the basis of selection of the "secret mode" item in the management function screen, whereas a second embodiment is configured to allow automatic authentication to start immediately on the basis of selection operation of the secret mode by starting the sub-camera 105 at the time of selection operation of a management function and bringing the sub-camera 105 into a photographable state prior to the selection operation of the secret mode (i.e. last operation) which requires face authentication.

Figure 10:
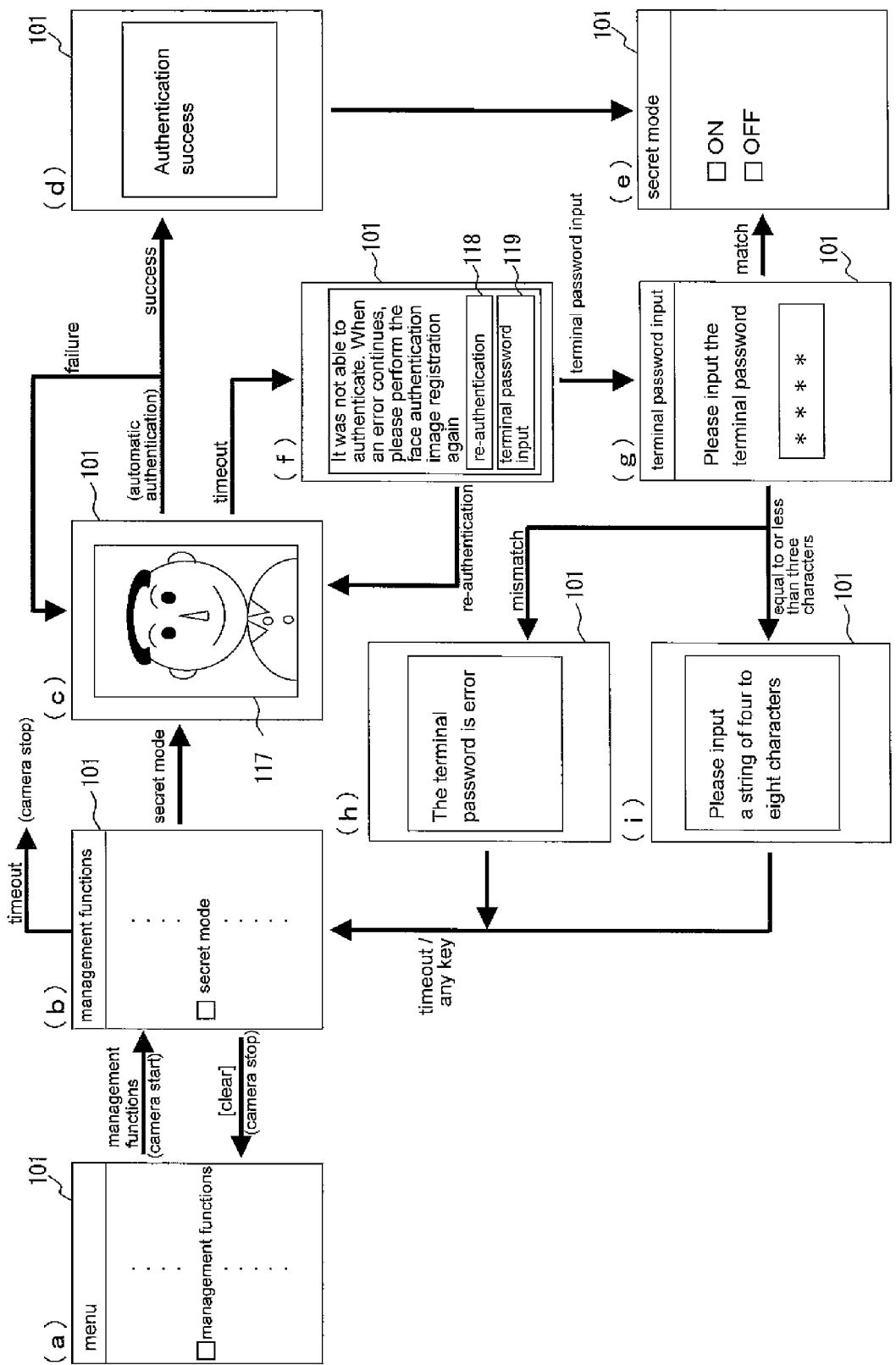
FIG. 10 is a diagram showing a display example of a main display part when the face authentication is carried out according to a second embodiment.

FIG. 10 is a diagram showing a display example of the main display part 101 in face authentication according to the second embodiment of the present invention. In a menu screen as shown in FIG. 10(a), operation to select a "management function" item out of items displayed in the menu screen cause the main display part to display a management function setting screen for setting management functions (refer to FIG. 10(b)), so that a screen for switching on/off of a secret mode can be displayed by operation to select a "secret mode" out of items displayed in the management function screen (refer to FIG. 10(e)). That is, on/off of the secret mode can be switched by a series of hierarchical operation in the present embodiment.

In the menu screen of FIG. 10(a), the operation to select the "management function" item out of items displayed in the menu screen causes the sub-camera 105 to start. Thereafter, the main display part 101 is switched to display the management function setting screen (refer to FIG. 10(b)), where the operation to select the "secret mode" item in the management function setting screen causes the main display part 101 to display a finder screen so as to start automatic authentication (refer to FIG. 10(c)).

Since an amount of time required in an initialization process of the sub-camera 105, i.e. an amount of time required from the start of the sub-camera 105 to reach a photographable state is about 0.5 second, the sub-camera 105 is usually brought into a photographable state in a period before a user performs selection operation of the "secret mode" item out of items displayed in the management function screen shown in FIG. 10(b). Accordingly, in response to the selection operation of the "secret mode" in the management function screen, automatic authentication is allowed to start immediately. Since processes performed after starting the automatic authentication and displays in the main display part 101 (refer to FIGS. 10(d) to 10(i)) are similar to the processes performed after starting the automatic authentication and the displays in the main display part 101 (refer to FIGS. 9(c) to 9(h)) in the first embodiment, explanation thereof will be omitted here.

In the present embodiment, if subsequent operation in the series of operation, i.e. the operation to select the "secret mode" item in the management function screen of FIG. 10(b) is not carried out within a predetermined amount of time and time lapses into timeout after starting the sub-camera 105 by operation to select the "management function" item in the menu screen of FIG. 10(a), driving the sub-camera 105 is discontinued by stopping a power supply to the sub-camera 105.

If operation which differs from the subsequent operation in the series of operation is carried out after starting the sub-camera 105 by the operation to select the "management function" operation in the menu screen of FIG. 10(a), driving the sub-camera 105 is also discontinued by stopping a power supply to the sub-camera 105 even in the case of, for example, returning to the menu screen by operating the clear key included in the operation keys 201.

Such a configuration makes it possible to prevent the sub-camera 105 from being left for a long period of time without starting the authentication process after starting the sub-camera 105. Since the sub-camera 105 consumes a relatively large amount of driving power, driving the sub-camera 105 is discontinued if subsequent selection operation is not carried out within a predetermined amount of time, so that reduction of power consumption can be achieved.

It should be noted that the configuration is not limited to a configuration of starting the sub-camera 105 on the basis of selection of the "management function" that is selection operation performed immediately before for selection of the "secret mode" which is last operation in the series of operation in order to determine execution of a process requiring the authentication process, and there may also be a configuration of starting the sub-camera 105 on the basis of any selection operation performed earlier in the series of operation. 73. Third Embodiment Explained in the first embodiment was the configuration of performing automatic authentication by starting the sub-camera 105 on the basis of selection of the "secret mode" item in the management function screen, whereas a third embodiment is configured to start automatic authentication immediately after the sub-camera 105 is brought into a photographable state by starting the sub-camera 105 at the time of selection operation of the management function prior to selection operation of the secret mode (i.e. last operation) which requires face authentication.

Figure 11:
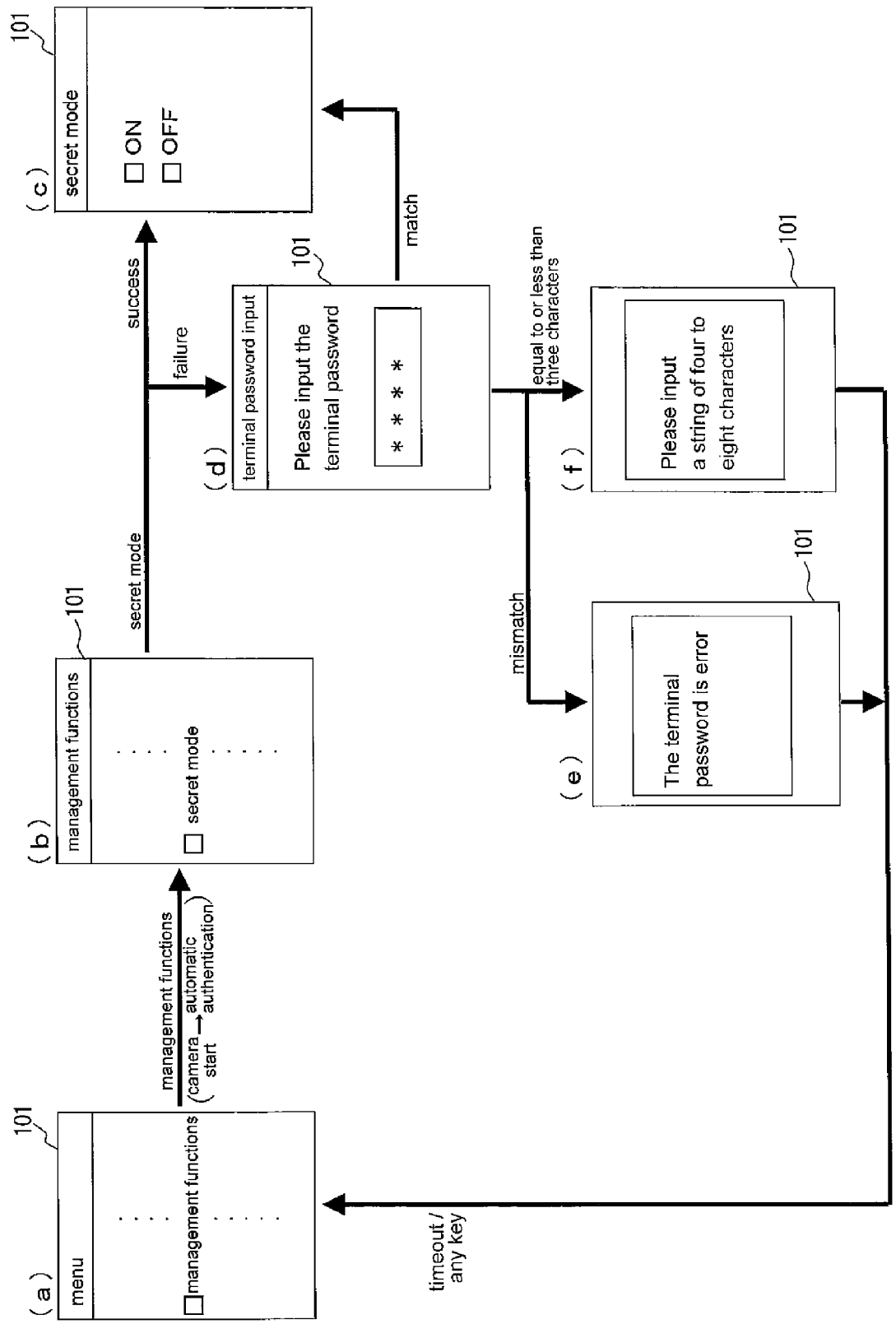
FIG. 11 is a diagram showing a display example of the main display part when the face authentication is carried out according to a third embodiment.

FIG. 11 is a diagram showing a display example of the main display part 101 in face authentication according to the third embodiment of the present invention. In a menu screen as shown in FIG. 11(a), operation to select a "management function" item out of items displayed in the menu screen causes the main display part to display a management function setting screen for setting a management function (refer to FIG. 11(b)), where operation to select the "secret mode" item out of items displayed in the management function screen allows the main display part to display a screen for switching on/off of the secret mode (refer to FIG. 11(c)). That is, the present embodiment makes it possible to switch on/off of the secret mode by a series of hierarchical operation.

In the menu screen of FIG. 11(a), operation to select the "management function" item out of items displayed in the menu screen causes the sub-camera 105 to start, and automatic authentication starts after the sub-camera 105 finishes an initialization process and turns into a photographable state. That is, on the basis of completion of the initialization process of the sub-camera 105, characteristic information is extracted from a face image which was automatically photographed without performing photographing operation by a user, and the characteristic information is compared with user characteristic information stored in advance in the characteristic information storage part 413 of the memory 410, so that the authentication process is automatically carried out.

In the present embodiment, if a matching degree of the characteristic information is smaller than an authentication threshold value and authentication has failed in the same manner with the first embodiment, the characteristic information is automatically extracted again from an image photographed by the sub-camera 105 at that time, and the characteristic information is compared with user characteristic information stored in the memory 410, so that the authentication process is repeated continuously until reaching timeout after a predetermined amount of time (ex. 3 seconds) lapses and the authentication process finishes at the time of achieving successful authentication. It should be noted that the present embodiment differs from the first embodiment in that a finder screen is not displayed in the main display part 101 while the authentication process is repeated.

Since an amount of time required in a single authentication process is about 0.4 seconds, and if successful authentication is achieved in a single authentication process, automatic authentication is usually completed in a period before a user performs operation to select the "secret mode" item out of items displayed in the management function screen as shown in FIG. 11(b). Accordingly, in the case of successful authentication, the main display part 101 is immediately switched to display a screen for switching on/off of the secret mode (refer to FIG. 11(c)) on the basis of operation to select the "secret mode" item in the management function screen.

However, if authentication has failed in a single authentication process and the authentication process is not completed yet at the time of performing operation to select the "secret mode" item by a user in such a case as the authentication process is carried out for a plural number of times, the operation to select the "secret item" may be followed by waiting for completion of the authentication process so as to perform a subsequent process.

If the authentication process is repeated within a predetermined amount of time and authentication has failed in each process, the operation to select the "secret mode" item out of items displayed in the management function screen shown in FIG. 11(b) is followed by displaying a terminal password input screen for guiding a user to input a terminal password in the main display part 101 (refer to FIG. 11(d)).

If a character string inputted in the terminal password input screen of FIG. 11(d) matches a terminal password set in advance, the main display part 101 is switched to display a screen for switching on/off of the secret mode (refer to FIG. 11(c)).

In contrast, if a character string inputted by operating the operation keys 201 does not match the terminal password set in advance in the terminal password input screen of FIG. 11(d), the main display part 101 displays a screen indicating the mismatch (refer to FIG. 11(e)). Moreover, if a character string equal to or less than three digits is inputted in the terminal password input screen, the main display part 101 displays a screen indicating that a character of four to eight digits should be inputted (refer to FIG. 11(f)). After displaying the screen as shown in FIG. 11(e) or FIG. 11(f), a predetermined period of time lapses into timeout or a user operates any key included in the operation keys 201, after which the main display part 101 returns to display the menu screen shown in FIG. 11(a).

However, the configuration is not limited to a configuration of starting the sub-camera 105 on the basis of selection of the "management functions" that is selection operation performed immediately before selection of the "secret mode" which is last operation in the series of operation in order to determine execution of a process requiring the authentication process, and the sub-camera 105 may also be configured to start on the basis of the selection operation performed long before the selection of the "secret mode" in the series of operation.

Moreover, the main display part 101 may display a finder screen during automatic authentication. In this case, it is preferable to provide a configuration where a finder screen is displayed in a part of a display screen of the main display part 101 so as not to prevent the series of operation.

Figure 12:
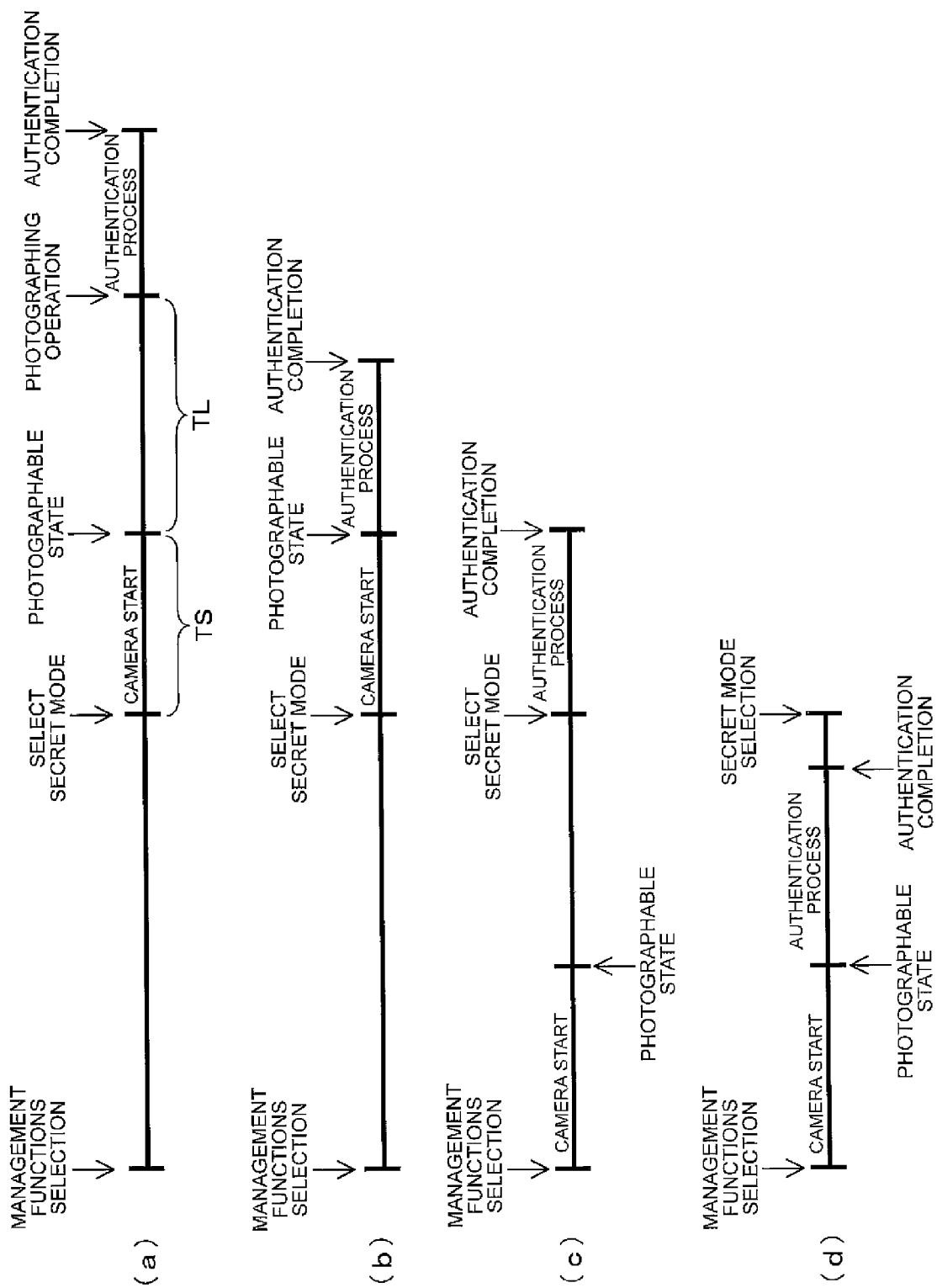
FIG. 12 is a time chart for comparing an amount of time required until completion of an authentication process, showing: a) a case of a conventional mobile phone; b) a case of the mobile phone according to the first embodiment; c) a case of the mobile phone according to the second embodiment; and d) a case of the mobile phone according to the third embodiment.

FIG. 12 is a time chart for comparing an amount of time required until completion of the authentication process, showing: a) the case of a conventional mobile phone; b) the case of the mobile phone according to the first embodiment; c) the case of the mobile phone according to the second embodiment; and d) the case of the mobile phone according to the third embodiment.

In the first to third embodiments, the sub-camera 105 is started on the basis of selection operation of the "secret mode" (FIG. 12(b)) or selection operation of the "management function" (FIGS. 12(c) and 12(d)) by a user, where the authentication process is automatically carried out after the sub-camera 105 is brought into a photographable state after completion of an initialization process (FIGS. 12(b) and 12(d)) or after the selection operation of the "secret mode" (FIG. 12(c)). That is, the characteristic information is automatically extracted from an image photographed by the sub-camera 105 without performing photographing operation by a user after starting the sub-camera 105, and the characteristic information is compared with user characteristic information stored in advance, so that the authentication process is carried out. Accordingly, it is made possible to prevent troublesome photographing operation performed by waiting for a time course from the start of the sub-camera 105 to reaching a photographable state as observed in the conventional example shown in FIG. 12(a) to pass, so that excessive time and labor required in the authentication process can be reduced.

It is also made possible to reduce a time lag TL as observed in the conventional example shown in FIG. 12(a) in a period from user confirmation of a photographable state obtained after starting the sub-camera 105 to performing photographing operation, where the authentication process can be carried out in a shorter period of time after starting the sub-camera 105, so that an amount of time required in the authentication process can be shortened.

On the basis of the selection operation of the "secret mode" which is last operation in the series of operation in order to determine execution of a process requiring the authentication process in the first embodiment shown in FIG. 12(b), and on the basis of the selection operation of the "management function" performed prior to last operation in the second and third embodiments shown in FIGS. 12(c) and 12(d), the authentication process is carried out by automatically starting the sub-camera 105. Accordingly, the sub-camera 105 can be started soon on the basis of operation performed prior to the last operation.

Particularly in the second and third embodiments shown in FIGS. 12(c) and 12(d), the sub-camera 105 is started on the basis of the selection operation of the "management function" which is performed prior to the last operation, allowing the sub-camera 105 to reach a photographable state before performing the last operation, so that waiting time TS (refer to FIG. 12(a)) observed before the sub-camera 105 is brought into a photographable state can be reduced.

Moreover, in the third embodiment shown in FIG. 12(d), the authentication process is automatically carried out immediately after the sub-camera 105 is brought into a photographable state, which enables completion of the authentication process before the last operation is carried out, so that an amount of time required in the authentication process can be further reduced.

According to the configuration of automatically performing the authentication process again in an authentication failure in the authentication process in the same manner with the first to third embodiments, even if a true user performs operation and the user is not determined to be a true user in a first authentication process, the authentication process is carried out again without performing photographing operation by a user thereafter. That is, the authentication process is automatically repeated until the user is determined to be the true user, which enables to reduce excessive time and labor required in the authentication process and shorten an amount of time required in the authentication process.

When a face image is photographed in the authentication process, it is preferable to provide a configuration where a shutter sound is not generated. Such a configuration makes it possible to prevent misunderstanding such as stealthy photographing caused by generation of the shutter sound when the authentication process is carried out in an environment surrounded by people in a train or the like. In the present embodiment, the photographing operation is not carried out in the authentication process, so that misunderstanding such as the stealthy photographing caused by performing the photographing operation can be prevented.

However, a configuration to reach timeout if a user is not determined to be a true user within a predetermined period of time is not limited, and there may also be a configuration of performing the authentication process repeatedly until achieving successful authentication. Moreover, the configuration of continuously performing the authentication process is not limited, and there may also be a configuration where the authentication process is carried out only for once after the sub-camera 105 is started and brought into a photographable state.

Furthermore, face authentication is not limited to be carried out at the time of switching on/off of the secret mode, and the face authentication can be carried out in various kinds of setting operation related to other functions whose security level or privacy level is high, including, for example, a card setting, call termination, lock setting, password change, caller number notification/non-notification setting, setting reset, software renewal, detail display of its own station number, and other data changes.

Also, the authentication process is not limited to face authentication performed on the basis of face images, and may be carried out on the basis of fingerprint images of a user or any other images which express a user. In this case, characteristic information of finger print images is extracted and compared to realize the authentication process.

The present invention is not limited to contents of the above embodiments, wherein various kinds of changes can be made within a range of claim descriptions.

The invention claimed is:

1. A portable information terminal device comprising:
   an imaging unit for photographing an object;
   photographing control means for controlling photographing operation performed by said imaging unit;
   characteristic information storage means for storing characteristic information extracted from face images as registered characteristic information in advance;
   authentication processing means for performing an authentication process by using said registered characteristic information on a basis of an image photographed by said imaging unit;
   operation input means that allows a user to select one of a different set of items displayed in a screen on a basis of each user's selection operation of a series of user's selection operations including a last operation that triggers initiation of said authentication process;
   imaging unit starting means for executing an initialization process of said imaging unit by supplying a power source to said imaging unit on a basis of said user's selection operation prior to said last operation in said series of said user's selection operations; and
   imaging unit stopping means for stopping said power source to said imaging unit when said user's selection operation different from said last operation in said series of said user's selection operations is carried out after starting said imaging unit, wherein
   said photographing control means starts photographing on a basis of completion of said initialization process of said imaging unit by said imaging unit starting means, and
   said authentication processing means starts said authentication process on a basis of said last operation.

2. The portable information terminal device according to claim 1, further comprising
   continuous authentication means for photographing an image again in an authentication failure in said authentication process and performing said authentication process on the basis of the photographed image by controlling said photographing control means and said authentication processing means.

3. The portable information terminal device according to claim 1 or 2, wherein
   said authentication processing means comprises:
      characteristic extraction means for extracting characteristic information from said photographed image;
      matching degree calculating means for obtaining a numerically expressed matching degree by comparing said characteristic information extracted by said characteristic extraction means with said registered characteristic information stored in said characteristic information storage means; and
      matching degree determination means for comparing said matching degree with an authentication threshold value, and
   the portable information terminal has a comparison result display means for displaying comparison results between said matching degree obtained in said authentication process and said authentication threshold value.

* * * * *